B. ENGLANDER.
VEHICLE.
APPLICATION FILED JULY 31, 1917.
1,262,597.
Patented Apr. 9, 1918.
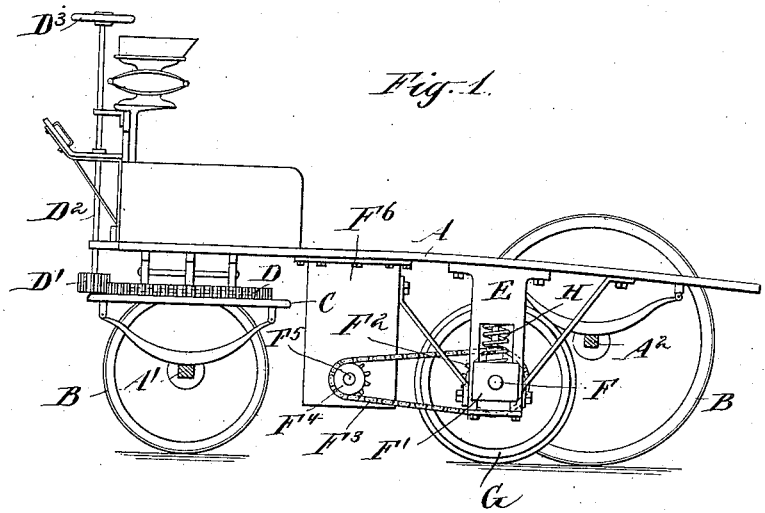
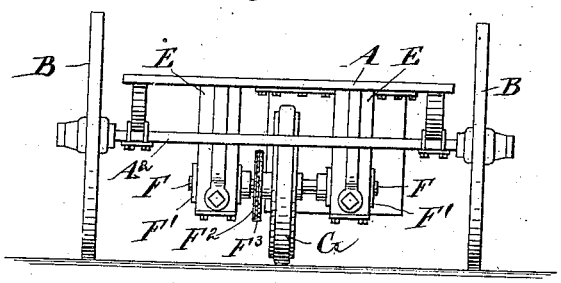
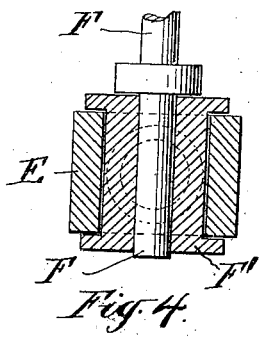
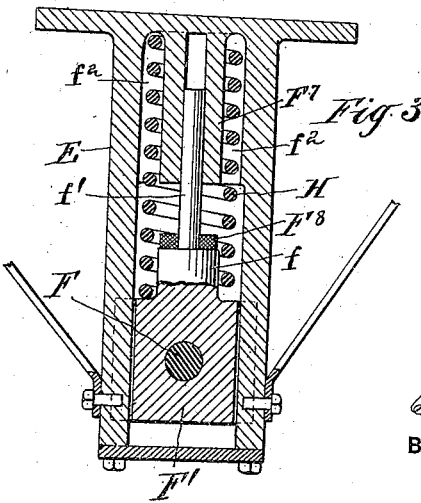
INVENTOR
Bethoven Englander
BY Charles R. Searle
ATTORNEY

UNITED STATES PATENT OFFICE.

BETHOVEN ENGLANDER, OF NEW YORK, N. Y., ASSIGNOR TO BETTY ENGLANDER, OF NEW YORK, N. Y.

VEHICLE.

1,262,597.   Specification of Letters Patent.   Patented Apr. 9, 1918.

Application filed July 31, 1917. Serial No. 183,650.

*To all whom it may concern:*

Be it known that I, BETHOVEN ENGLANDER, a citizen of the United States, residing in the city of New York, borough of Manhattan, in the county and State of New York, have invented a certain new and useful Improvement in Vehicles, of which the following is a specification.

The invention relates to wheeled vehicles adapted to travel upon the usual streets and roads, and the object of the invention is to provide means whereby various types of horse-drawn vehicles, as trucks, wagons and the like, may be transformed into motor-driven vehicles, easily and economically by adding a motor and traction-wheel designed for such service.

The invention consists in certain novel features of construction, and arrangement of parts by which the above objects are attained, to be hereinafter described and claimed.

The accompanying drawings form a part of this specification and show an approved form of the invention.

Figure 1 is a side elevation of a truck equipped with the invention.

Fig. 2 is a corresponding rear elevation.

Fig. 3 is a vertical section on a larger scale, showing one of the housings and yielding boxes in which the traction-shaft is mounted.

Fig. 4 is a corresponding horizontal section taken on the axial line of the traction-shaft and showing the latter in plan.

Similar letters of reference indicate the same parts in all the figures.

A is the body of a truck of a common type, having axles $A^1$ $A^2$, wheels B B, and other usual equipment, but with the tongue omitted.

Inclosing the usual fifth-wheel mechanism and secured to the platform C thereof is a toothed ring D in mesh with a pinion $D^1$ on a vertical shaft $D^2$ carrying a steering-wheel $D^3$ located conveniently to the usual driver's seat, by which the fore-axle may be swung in steering the vehicle.

Beneath the body A and secured thereto are two transversely arranged housings or yokes E E receiving boxes $F^1$ $F^1$ arranged to slide vertically therein and carrying a transverse traction-shaft F on which is mounted a sprocket wheel $F^2$ driven by a spocket chain $F^3$ from a sprocket wheel $F^4$ on the motor-shaft $F^5$ of a motor, not shown, mounted in a casing $F^6$ securely bolted to the body A forward of the housings E. E. The motor may be of any approved type adapted to the service.

On the shaft F between the housings and preferably on the center line of the vehicle, is secured a traction-wheel G adapted to engage the road-bed and propel the vehicle when the shaft F is rotated by the motor.

In order to insure the required frictional grip on the road-bed, the boxes $F^1$ $F^1$ are forced downwardly by strong helical springs H H each abutting at one end in the housing and at the other against its box. The latter has a cylindrical boss $f$ on its upper face receiving the lower end of the spring, from which extends a rod $f^1$ received and guided in a tubular extension $F^7$ reaching downwardly within the housing and inclosed by the upper end of the spring H which is received and guided in an annular recess $f^2$ surrounding the extension $F^7$, as shown in Fig. 3.

On the boss $f$ and encircling the rod $f^1$ is an annular washer or cushion $F^8$ of rubber or the like, adapted to receive the lower end of the extension $F^7$ and soften the impact when for any reason the spring H permits these surfaces to come together.

The location of the motor and the traction-wheel G may be varied as required in adapting the invention to various types of vehicles, and other means for holding and guiding the shaft F may be substituted for the housings E E. Other forms of steering mechanism may be employed.

I claim:—

In a vehicle of the character described, the combination with the body and supporting wheels, of yokes depending from said body, boxes vertically movable in said yokes, a shaft mounted in said boxes, a traction wheel carried by said shaft, a motor suspended from the body, means for driving said traction wheel from said motor, tubular extensions within said yokes, bosses on the said boxes and rods extending upward from said bosses and slidable within said extensions, and springs within said yokes encircling said bosses and extensions and acting directly upon said boxes.

In testimony that I claim the invention above set forth I affix my signature.

BETHOVEN ENGLANDER.

Copies of this patent may be obtained for five cents each, by addressing the "Commissioner of Patents. Washington, D. C."